(12) United States Patent
Lee et al.

(10) Patent No.: US 10,815,850 B2
(45) Date of Patent: Oct. 27, 2020

(54) METHOD FOR CATALYST PURGE CONTROL BASED ON ENGINE TEMPERATURE AND VEHICLE USING THE SAME

(71) Applicants: HYUNDAI MOTOR COMPANY, Seoul (KR); KIA MOTORS CORPORATION, Seoul (KR)

(72) Inventors: Dong-Hoon Lee, Gunpo-si (KR); Seung-Mook You, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 48 days.

(21) Appl. No.: 16/179,130

(22) Filed: Nov. 2, 2018

(65) Prior Publication Data

US 2019/0178127 A1 Jun. 13, 2019

(30) Foreign Application Priority Data

Dec. 12, 2017 (KR) .......................... 10-2017-0170445

(51) Int. Cl.

| | |
|---|---|
| *F01N 3/08* | (2006.01) |
| *F02D 41/02* | (2006.01) |
| *F02D 41/12* | (2006.01) |
| *F01N 3/20* | (2006.01) |
| *F01N 9/00* | (2006.01) |
| *F01N 11/00* | (2006.01) |

(52) U.S. Cl.
CPC ............. *F01N 3/0885* (2013.01); *F01N 3/08* (2013.01); *F01N 3/20* (2013.01); *F01N 9/00* (2013.01); *F01N 11/00* (2013.01); *F02D 41/0275* (2013.01); *F02D 41/0295* (2013.01); *F02D 41/126* (2013.01); *F01N 2260/04* (2013.01); *F01N 2430/00* (2013.01); *F01N 2900/08* (2013.01); *F02D 2200/021* (2013.01); *F02D 2200/023* (2013.01)

(58) Field of Classification Search
CPC combination set(s) only.
See application file for complete search history.

(56) References Cited

U.S. PATENT DOCUMENTS

| 7,559,192 B2 * | 7/2009 | Suenaga ................. F01N 3/101 |
| | | 123/406.13 |
| 8,738,272 B2 * | 5/2014 | Ezaki ...................... F02D 13/08 |
| | | 60/285 |
| 9,296,390 B2 * | 3/2016 | Martin ................ F02D 41/1495 |
| 2002/0038543 A1 * | 4/2002 | Nishimura ............ F01N 3/0842 |
| | | 60/284 |

(Continued)

FOREIGN PATENT DOCUMENTS

| JP | 2012-241695 A | 12/2012 |
| JP | 2014-118965 A | 6/2014 |

*Primary Examiner* — Binh Q Tran
(74) *Attorney, Agent, or Firm* — Brinks Gilson & Lione

(57) ABSTRACT

A method for catalyst purge control may include the steps of: performing, by a catalyst purge electronic control unit (ECU), catalyst purge control based on engine temperature; calculating an estimated engine temperature the catalyst purge ECU when fuel-cut is completed, and controlling, by the catalyst purge ECU, an amount of purge fuel injected by an injector based on the estimated engine temperature for the catalyst purge control.

18 Claims, 6 Drawing Sheets

(56) References Cited

U.S. PATENT DOCUMENTS

| | | | |
|---|---|---|---|
| 2006/0207241 A1* | 9/2006 | Araki | F02D 41/0255 60/284 |
| 2015/0218989 A1* | 8/2015 | Kaneko | F01N 3/2006 60/286 |
| 2016/0222850 A1* | 8/2016 | Ota | F01N 3/106 |

* cited by examiner

METHOD FOR CATALYST PURGE CONTROL BASED ON ENGINE TEMPERATURE AND VEHICLE USING THE SAME

CROSS-REFERENCE TO RELATED APPLICATION

This application claims priority to and the benefit of Korean Patent Application No. 10-2017-0170445, filed on Dec. 12, 2017, the entire contents of which are incorporated herein by reference.

FIELD

Exemplary forms of the present disclosure relate to catalyst purge control for a vehicle.

BACKGROUND

The statements in this section merely provide background information related to the present disclosure and may not constitute prior art.

In general, vehicles use a catalyst system suitable for removal of regulated pollutants such as nitrogen oxide (NOx) and CO/HC caused by engine combustion to comply with emission and environmental regulations.

In particular, the catalyst used for diesel oxidation catalysts (DOCs), catalyzed particulate filters (CPFs), selective catalyst reductions (SCRs), three way catalysts (TWCs), or the like has specialized performance in NOx or CO/HC and contributes to improving performance of the catalyst system. And, the catalyst needs to remove oxygen that is a causative factor of excessive NOx emission.

For example, the introduction of oxygen into the catalyst is deeply involved in fuel-cut ON/OFF of an engine. The fuel-cut ON/OFF is a method of inhibiting or preventing unnecessary consumption of fuel in such a manner that an electronic control unit (ECU) for controlling an engine executes fuel-cut ON to stop the injection of fuel into the engine at the time of engine overrun (e.g., which is a phenomenon occurring when a driver does not press an accelerator pedal because any more power is not required while a vehicle is driven at a certain speed). Thus, the execution of the fuel-cut ON/OFF increases the oxygen introduced into the catalyst and degrades NOx reduction performance.

The catalyst system performs catalyst purge control based on catalyst deterioration, for removing oxygen from a catalyst during fuel injection and matching an injection amount of fuel with catalyst deterioration. For example, the catalyst purge control based on catalyst deterioration effectively removes the oxygen introduced into the catalyst after the stop of fuel-cut by increasing the injection amount of fuel according to the catalyst deterioration.

As a result, the catalyst purge control based on catalyst deterioration improves the catalyst system to satisfy the emission and environmental regulations of the vehicle.

However, we have discovered that the catalyst purge control based on catalyst deterioration does not consider a reduction of NOx generated according to engine temperature since it uses only a deterioration degree representing the performance of catalyst itself.

Furthermore, we have discovered that the catalyst purge control based on catalyst deterioration does not reflect engine combustion characteristics for reducing nitrogen oxide generated at the time of combustion in a low-temperature area. Moreover, since the catalyst purge control based on catalyst deterioration is performed richer than the theoretical air-fuel ratio ($\lambda=1$) for catalyst purge, fuel may be consumed regardless of engine power.

SUMMARY

The present disclosure provides a method for catalyst purge control based on engine temperature, which performs improved catalyst purge control based on engine temperature by applying an engine temperature to catalyst purge after fuel-cut ON/OFF, and a vehicle using the same. Additionally, the method improves fuel efficiency by reducing an amount of fuel used for catalyst purge in a low-temperature operating condition based on engine combustion characteristics for reducing a generation of nitrogen oxide when the engine temperature is low.

Other objects and advantages of the present disclosure can be understood by the following description, and become apparent with reference to the forms of the present disclosure. Also, it is obvious to those skilled in the art to which the present disclosure pertains that the objects and advantages of the present disclosure can be realized by the means as claimed and combinations thereof.

In one form of the present disclosure, a method for catalyst purge control includes the steps of: performing, by a catalyst purge electronic control unit (ECU), catalyst purge control based on engine temperature; calculating an estimated engine temperature the catalyst purge ECU when fuel-cut ON is changed to fuel-cut OFF; and controlling, by the catalyst purge ECU, an amount of purge fuel injected by an injector based on the estimated engine temperature for the catalyst purge control.

In the method for catalyst purge control, the estimated engine temperature may be an engine temperature at which the generation of nitrogen oxide is reduced. The estimated engine temperature may be calculated by a temperature sensor or a temperature modeling. The temperature sensor may be a coolant temperature sensor or an engine oil sensor, and the temperature modeling may be based on a temperature detection value of the coolant temperature sensor.

The step of performing the catalyst purge control based on he engine temperature may include steps of: (A) receiving a temperature value detected by a temperature sensor when a fuel-cut ON signal is changed to a fuel-cut OFF signal, (B) calculating the estimated engine temperature when the detected temperature value is received, (C) controlling an injection amount of catalyst purge fuel based on an operating condition determined by the calculation of the estimated engine temperature, and (D) controlling an injection amount of rich fuel based on the operating condition, and outputting a fuel injection signal to control and the amount of the purge fuel.

The step of receiving the temperature value may include the steps of: (a-1) checking the fuel-cut ON signal, (a-2) obtaining the detected temperature value by detecting vehicle information at a time of the fuel-cut ON, and (a-3) checking the fuel-cut OFF signal when the detected temperature value is obtained. The temperature value may include at least one of a coolant temperature value and an oil temperature value.

The step of calculating the estimated engine temperature may include: (b-1) calculating the estimated engine temperature by the detected temperature value when the detected temperature value is checked, and (b-2) calculating the estimated engine temperature by a temperature modeling based on the detected temperature value when the detected temperature value is checked. The temperature modeling may be performed when the detected temperature value is a coolant temperature value.

The regulating (i.e., controlling) an injection amount of catalyst purge fuel may include: (c-1) determining the operating condition by setting the estimated engine temperature as a threshold, (c-2) dividing the operating condition into a low-temperature operating condition and a high-temperature operating condition based on the estimated engine temperature, (c-3) controlling the injection amount of rich fuel in a manner that regulates the injection amount of rich fuel in the low-temperature operating condition but uses the injection amount of rich fuel in the high-temperature operating condition, and (c-4) outputting the fuel injection signal suitable for the regulation of the injection amount of rich fuel and the use of the injection amount of rich fuel. The operating condition may be the low-temperature operating condition when the estimated engine temperature is less than the threshold whereas the operating condition may be the high-temperature operating condition when the estimated engine temperature is equal to or more than the threshold. The threshold may be a temperature at which a generation of nitrogen oxide is reduced in an engine. The injection amount of rich fuel may mean a state in which an injection amount of fuel is richer than a theoretical air-fuel ratio ($\lambda=1$) for catalyst purge. The output of the fuel injection signal may be performed by variable purge time-based fuel rate control using a purge time change when a purge fuel rate lambda value is maintained, or by variable purge fuel rate control using a purge fuel rate change when a purge time is maintained.

When the estimated engine temperature is not calculated, the catalyst purge ECU may change to catalyst purge control based on deterioration using catalyst deterioration.

In another form of the present disclosure, a vehicle includes: a catalyst purge ECU that calculates an estimated engine temperature when a change from fuel-cut ON to fuel-cut OFF is checked, controls an amount of purge fuel injected to a catalyst by an injector by catalyst purge control based on the estimated engine temperature, when the estimated engine temperature is calculated, but controls the amount of purge fuel injected by the injector by catalyst purge control based on the deterioration of the catalyst, when the estimated engine temperature is not calculated.

The catalyst purge ECU may include an engine-based purge map for calculating a value of the estimated engine temperature, and the engine-based purge map may include a temperature sensor purge map for calculating the estimated engine temperature value via a temperature sensor, and a temperature modeling purge map for calculating the estimated engine temperature value via a temperature modeling.

The catalyst purge ECU may include a purge fuel control map for calculating a control value of the amount of purge fuel, and the purge fuel control map may include a variable purge time map for controlling the amount of purge fuel by variable purge time-based fuel rate control using a purge time change when a purge fuel rate lambda value is maintained, and a variable purge fuel map for controlling the amount of purge fuel by variable purge fuel rate control using a purge fuel rate change when a purge time is maintained.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
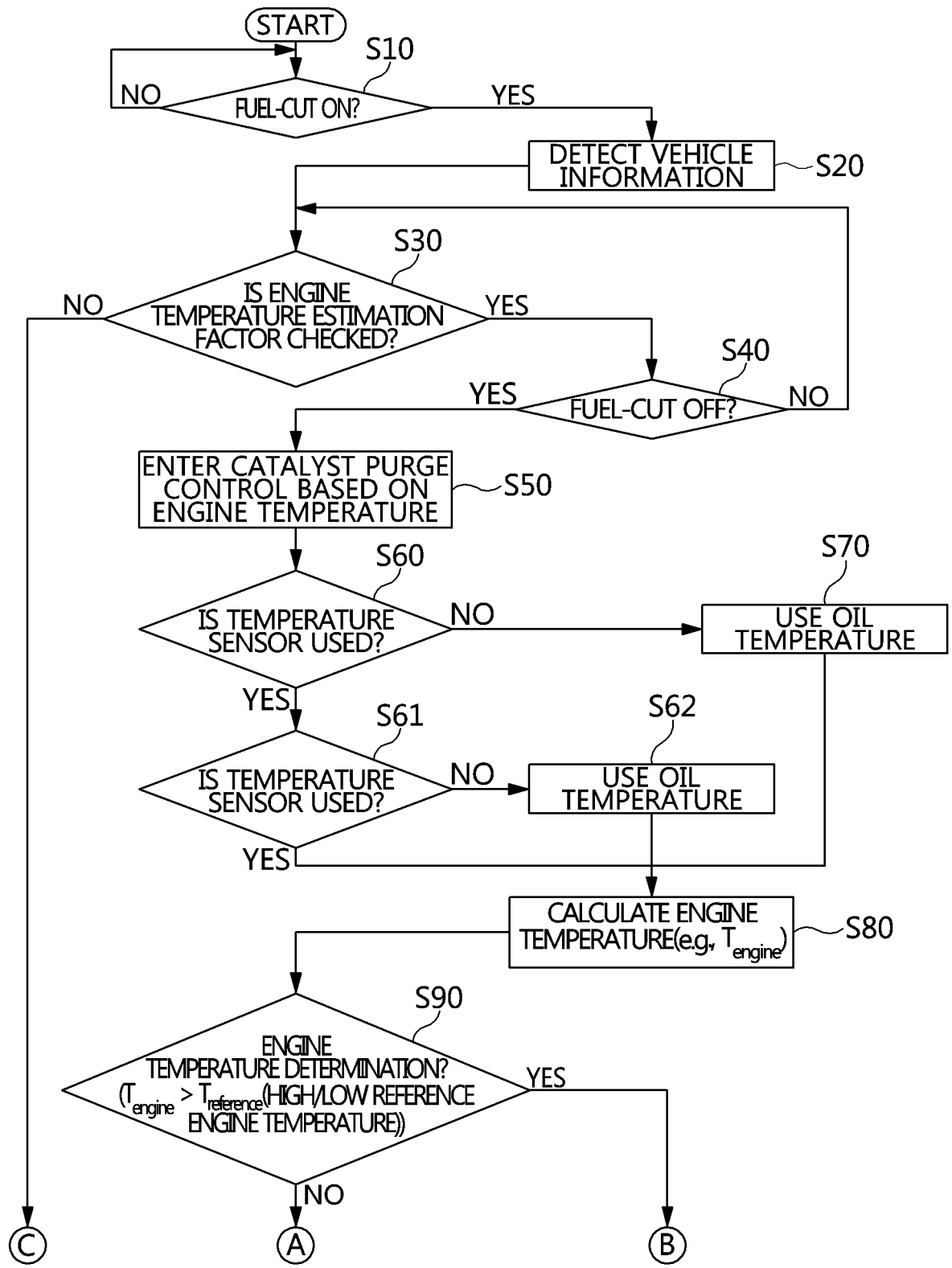
FIG. 1 and FIG. 2 are flowcharts illustrating a method for catalyst purge control based on engine temperature according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary forms of the present disclosure will be described below in more detail with reference to the accompanying drawings. The present disclosure may, however, be embodied in different forms and should not be construed as limited to the forms set forth herein. Rather, these forms are provided so that this disclosure will be thorough and complete, and will fully convey the scope of the present disclosure to those skilled in the art.

Figure 2:
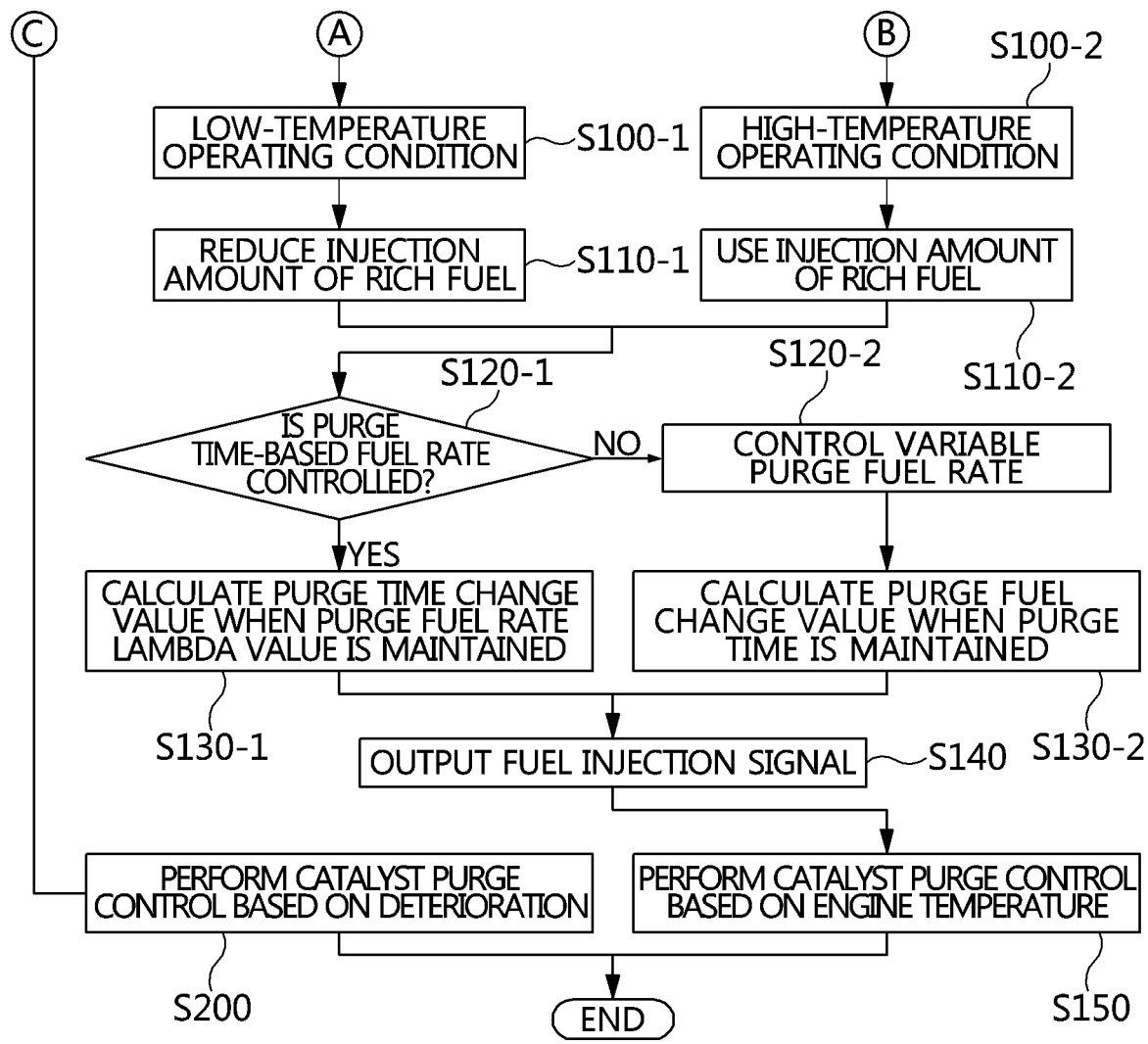

Referring to FIG. 1 and FIG. 2, a method for catalyst purge control based on engine temperature according to one form of the present disclosure includes: checking an engine temperature estimation factor when fuel-cut ON is changed to fuel-cut OFF (S10 to S40), and performing catalyst purge control based on engine temperature (S150) when the engine temperature estimation factor is checked but performing catalyst purge control based on deterioration (S200) when the engine temperature estimation factor is not checked. Particularly, the catalyst purge control based on engine temperature (S150) is characterized in that fuel rate control based on purge time or variable purge fuel rate control is performed after a low-temperature operating condition and a high-temperature operating condition are determined according to the engine temperature using a temperature sensor or a temperature modeling (S50 to S140).

As a result, the catalyst purge control based on engine temperature (S150) effectively inhibits or prevents the generation of nitrogen oxide according to the engine temperature, which was not resolved in conventional catalyst purge control based on only catalyst deterioration (i.e., which effectively purifies nitrogen oxide by the injection of fuel made richer than the theoretical air-fuel ratio in order to remove nitrogen oxide caused due to oxygen collected in catalyst during fuel-cut after execution of fuel-cut ON/OFF for improvement of fuel efficiency by a driver's demand in an overrun state).

Especially, the method for catalyst purge control based on engine temperature is characterized in that it uses combustion characteristics causing the generation of nitrogen oxide during combustion to vary depending on the engine temperature.

Figure 3:
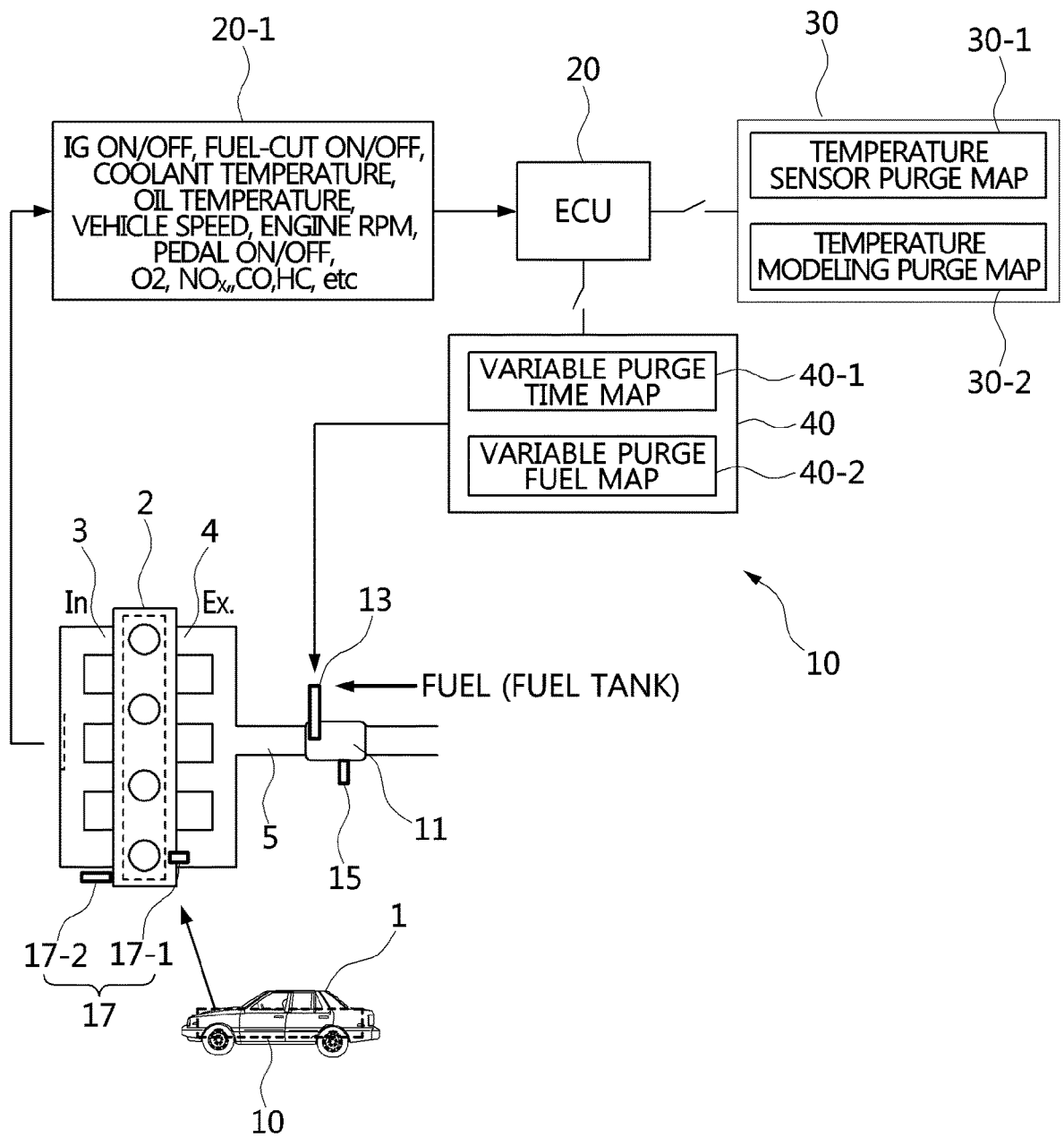
FIG. 3 is a diagram illustrating an example of a vehicle using the catalyst purge control based on engine temperature in one form of the present disclosure.

Referring to FIG. 3, a vehicle 1 includes an engine 2, and a catalyst system 10 installed in an exhaust line 5 through which the exhaust gas generated by the engine 2 is discharged.

In detail, the engine 2 performs combustion by new air supplied to an intake manifold 3 and sends exhaust gas to an exhaust manifold 4. The engine 2 may be a gasoline engine or a diesel engine. The exhaust line 5 is connected to the exhaust manifold 4 and provided with the catalyst system 10 such that nitrogen oxide (NOx) or particulate matter (PM) in exhaust gas is removed while the exhaust gas flows in the exhaust line. The purified exhaust gas is discharged through the exhaust line to the outside.

The catalyst system 10 includes a catalyst 11, a fuel injector 13, sensors 13, 15, and 17, and a catalyst purge electronic control unit (ECU) 20.

For example, the catalyst 11 is used for a diesel particulate filter (DPF) that regenerates a catalyst due to oxygen collected in the catalyst when the nitrogen oxide in exhaust gas is purified. However, the catalyst 11 may be used for a catalyzed particulate filter (CPF), a selective catalyst reduction (SCR), or the like. The fuel injector 13 injects fuel by the control of the catalyst purge ECU 20 when catalyst purge control is performed on the catalyst 11.

The oxygen sensor 15 detects or calculates a concentration of oxygen collected in the catalyst 11, and sends it to the catalyst purge ECU 20. The temperature sensor 17 includes a coolant temperature sensor 17-1 for detecting a temperature of coolant in the engine 2, and an engine oil temperature sensor 17-2 for detecting a temperature of oil in the engine 2, and sends the detected coolant temperature and engine oil temperature to the catalyst purge ECU 20.

The catalyst purge ECU 20 is connected to a data input unit 20-1, and includes an engine-based purge map 30 and a purge fuel control map 40.

The data input unit 20-1 sends the detected information of the vehicle 1 and the engine 2 to the ECU 20. The detected information includes an IG ON/OFF signal, a fuel-cut ON/OFF signal, a coolant temperature value, an oil temperature value, an $O_2$ concentration value, an NOx/CO/HC concentration value, an engine revolution per minute (RPM), a pedal (accelerator/brake pedal) ON/OFF signal, etc.

The engine-based purge map 30 includes a temperature sensor purge map 30-1 and a temperature modeling purge map 30-2. The temperature sensor purge map 30-1 is established by a temperature table in which a coolant temperature and an engine oil temperature are categorized according to the temperature area. The temperature modeling purge map 30-2 is established by a temperature table in which a coolant temperature and an estimated temperature in the cylinder of the engine 2 are categorized according to the temperature area. Therefore, each temperature table of the temperature sensor purge map 30-1 and the temperature modeling purge map 30-2 are established by control values that satisfy an emission standard by decreasing an amount of fuel for purge control of oxygen in catalyst in an operating area in which nitrogen oxide is less generated when the temperature of the engine 2 is low, and on the other hand, by increasing an amount of fuel for purge control when the temperature of the engine 2 is high. Especially, the temperature modeling purge map 30-2 is more effective to suppress nitrogen oxide in the purge control of the catalyst 11 by remedying disadvantages to the slow response of the temperature sensor to detect a relatively accurate combustion condition.

The purge fuel control map 40 includes a variable purge time map 40-1 and a variable purge fuel map 40-2. The variable purge time map 40-1 is established by a time table which reflects the temperature table to vary a purge time while constantly maintaining a purge fuel lambda. The variable purge fuel map 40-2 is established by a fuel table that varies an amount of purge fuel while constantly maintaining a purge time.

Hereinafter, the method for catalyst purge control based on engine temperature will be described in detail with reference to FIGS. 3 to 6. Here, the catalyst purge ECU 20 connected to the data input unit 20-1, the engine-based purge map 30, and the purge fuel control map 40 is a control subject, and the catalyst system 10 for performing the purge control of the catalyst 11, especially the fuel injector 13 for fuel injection is a control target.

The catalyst purge ECU 20 performs the entry to engine temperature-based catalyst purge control while the vehicle 1 travels. To this end, the catalyst purge ECU 20 performs a fuel-cut ON check step S10, a vehicle information detection step S20, an engine temperature estimation factor check step S30, a fuel-cut OFF step S40, and an engine temperature-based catalyst purge control entry step S50.

Referring to FIG. 3, the catalyst purge ECU 20 reads a fuel-cut ON signal transmitted from the data input unit 20-1 to check fuel-cut ON (S10), reads an IG ON/OFF signal, a fuel-cut ON/OFF signal, a coolant temperature value, an oil temperature value, an $O_2$ concentration value, an NOx/CO/HC concentration value, an RPM, and a pedal (accelerator/brake pedal) ON/OFF signal, transmitted from the data input unit 20-1 to detect vehicle information (S20), and reads a coolant temperature value and an oil temperature value transmitted from the data input unit 20-1 to check an engine temperature estimation factor (S30).

When the catalyst purge ECU 20 does not read the coolant temperature value and the oil temperature value, it is determined that the engine temperature estimation factor is not checked. In this case, after the engine temperature-based catalyst purge control (S50) is completed, the process proceeds to a deterioration-based catalyst purge control (S200). The deterioration-based catalyst purge control means catalyst purge control after fuel-cut OFF based on the deterioration of the catalyst 11. On the other hand, when the catalyst purge ECU 20 reads the coolant temperature value and the oil temperature value, it is determined that the engine temperature estimation factor is checked. In this case, after the engine temperature estimation factor is continuously checked until the fuel-cut OFF is checked (S40), the entry to the engine temperature-based catalyst purge control is performed when the fuel-cut OFF is checked (S50).

Next, the catalyst purge ECU 20 performs engine temperature-based catalyst purge control determination after the entry to the engine temperature-based catalyst purge control. To this end, the catalyst purge ECU 20 performs an engine temperature calculation step S60 to S80, a catalyst purge fuel injection rate regulation step S90 to S110-2, and a catalyst purge fuel injection rate step S120-1 to S140.

In detail, in the engine temperature calculation step S60 to S80, it is determined whether the temperature sensor is used (S60). When the temperature sensor is used, one of coolant and oil temperatures is used as in the coolant temperature application (S61) and the oil temperature application (S62). When the temperature sensor is not used, the process is completed by modeling the temperature in the cylinder using the detected coolant temperature as in the temperature modeling application (S70) and calculating an engine temperature (S80).

Referring to FIG. 3, in the coolant temperature application (S61) and the oil temperature application (S62), the catalyst purge ECU 20 is connected to the temperature sensor purge map 30-1 of the engine-based purge map 30 to match the temperature table of the temperature sensor purge map 30-1, thereby calculating $T_{engine}$ as an engine temperature value. On the other hand, in the temperature modeling application (S70), the catalyst purge ECU 20 is connected to the temperature modeling purge map 30-2 of the engine-based purge map 30 to match the temperature table of the temperature modeling purge map 30-1, thereby calculating $T_{engine}$ as an engine temperature value.

As a result, the engine temperature value ($T_{engine}$) is calculated as a specific numerical value. However, since the specific numerical value of the engine temperature value ($T_{engine}$) is varied in the fuel-cut ON/OFF condition of the engine 2, it may not be specified in the form of the present disclosure.

In detail, in the catalyst purge fuel injection rate regulation step S90 to S110-2, an engine condition is determined by comparing the engine temperature value ($T_{engine}$) with a reference value as in step S90. To this end, the engine condition is determined the following equation:

$$\text{engine condition: } T_{engine} > T_{reference}.$$

Here, "$T_{engine}$" is an engine temperature value calculated by the temperature sensor or the temperature modeling, "$T_{reference}$" is a threshold that is indicative of a high/low reference engine temperature and is set as a temperature at which the generation of nitrogen oxide is decreased in the engine 2, and ">" is a sign of inequality indicative of the size between two values.

When the engine temperature value ($T_{engine}$) is less than the threshold ($T_{reference}$), it is determined to be a low-temperature operating condition as in step S100-1. On the other hand, when the engine temperature value ($T_{engine}$) is equal to or more than the threshold ($T_{reference}$), it is determined to be a high-temperature operating condition as in step S100-2.

As a result, an injection amount of rich fuel is reduced as in step S110-1 in the low-temperature operating condition (S100-1), whereas the injection amount of rich fuel is used as in S110-2 in the high-temperature operating condition (S100-2). Here, the term "rich" means a state in which the injection amount of fuel is richer than the theoretical air-fuel ratio ($\lambda=1$) for catalyst purge.

In detail, in the catalyst purge fuel injection rate step S120-1 to S140, variable purge time-based fuel rate control is determined (S120-1) and variable purge fuel rate control is performed (S120-2). According to each of them, a fuel injection signal is output (S140). Particularly, in the variable purge time-based fuel rate control, a purge time change value when a purge fuel rate lambda value is maintained is calculated by matching the time table of the variable purge time map 40-1. On the other hand, in the variable purge fuel rate control (S120-2), a purge fuel rate change value when a purge time is maintained is calculated by matching the fuel table of the variable purge fuel map 40-2.

As a result, the catalyst purge ECU 20 controls the fuel injector 13 by outputting the fuel injection signal (S140) indicative of the purge time or the purge fuel rate as a variable.

Finally, the catalyst purge ECU 20 performs the catalyst purge control based on engine temperature (S150). The catalyst purge control based on engine temperature (S150) includes catalyst purge control based on engine temperature using the variable purge time-based fuel rate control and catalyst purge control based on engine temperature using the variable purge fuel rate control.

Figure 4:
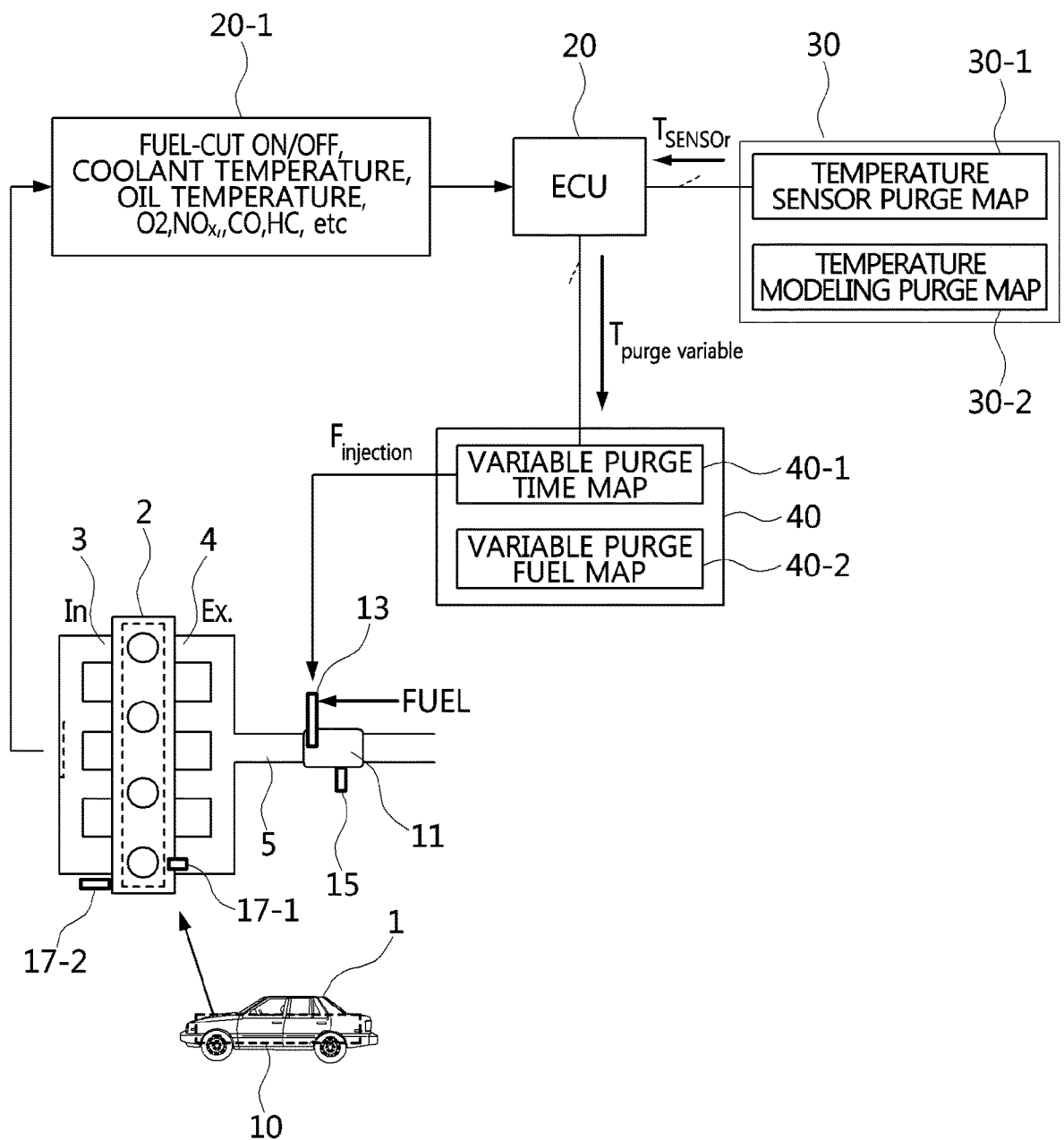
FIG. 4 is a diagram illustrating an operation state in which the catalyst purge control is performed on the vehicle using a temperature sensor and a variable purge time in one form of the present disclosure.
Figure 5:
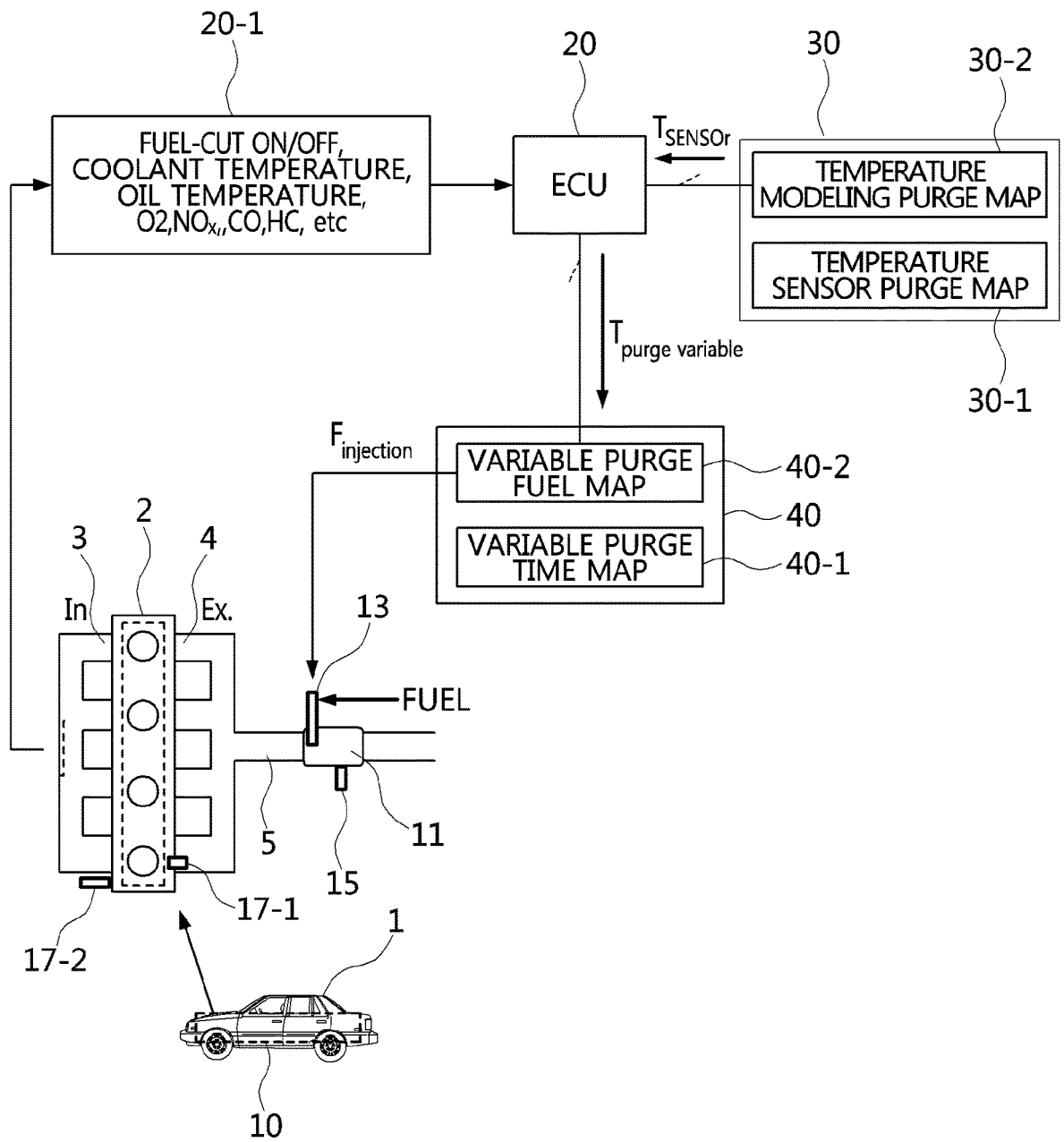
FIG. 5 is a diagram illustrating an operation state in which the catalyst purge control is performed on the vehicle using a temperature modeling and a variable purge time in one form of the present disclosure.
Figure 6:
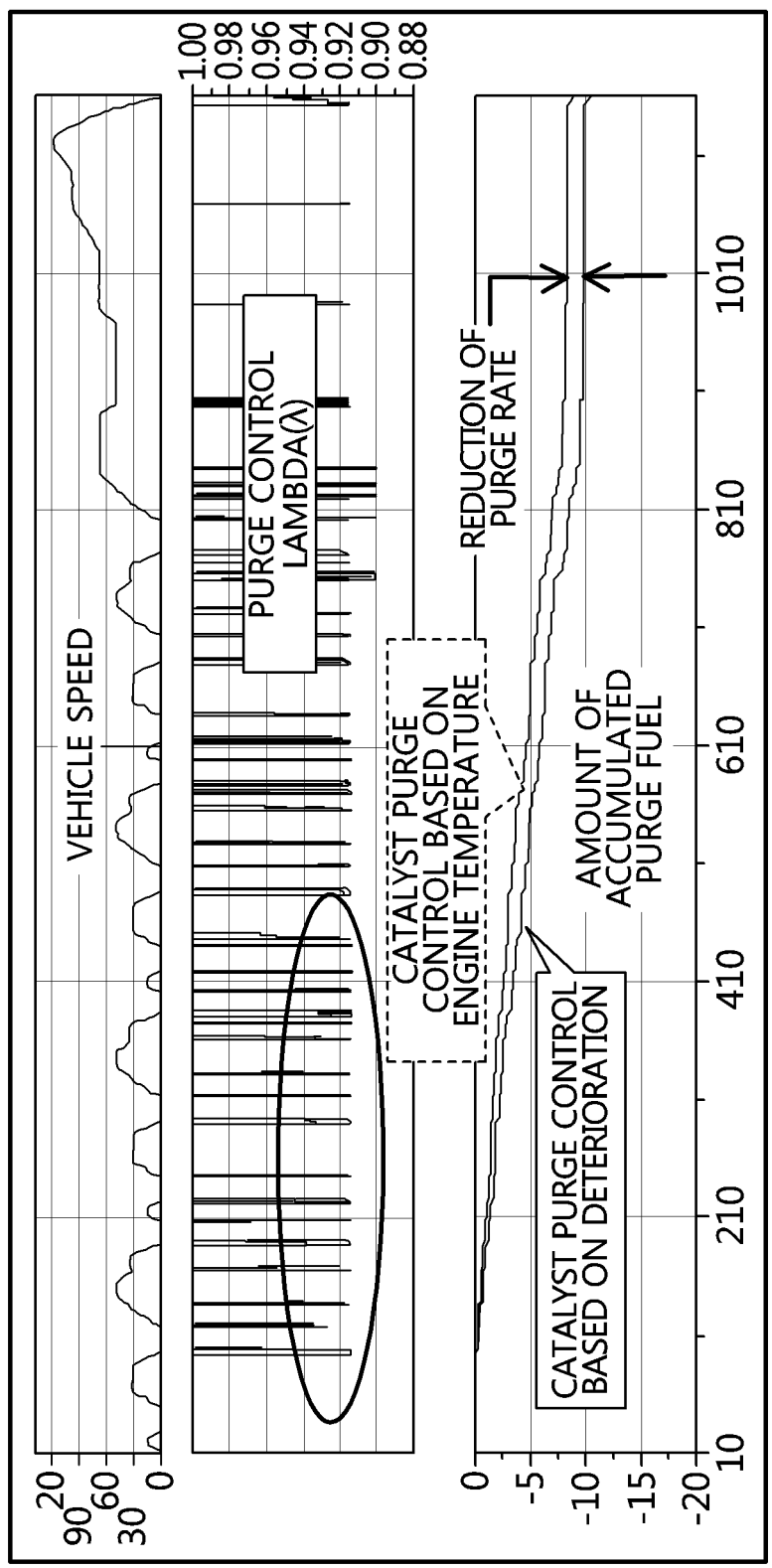
FIG. 6 is a chart illustrating an effect of the catalyst purge control based on engine temperature in one form of the present disclosure.

Meanwhile, FIGS. 4 to 6 illustrate an example in which the catalyst purge control based on engine temperature is implemented.

FIG. 4 illustrates an example in which the catalyst system 10 is controlled by the catalyst purge control based on engine temperature using the variable purge time-based fuel rate control, according to the temperature sensor purge map 30-1 and the variable purge time map 40-1.

As illustrated in the drawing, the catalyst purge ECU 20 outputs fuel injection signals indicative of a coolant or oil temperature-based engine temperature value ($T_{sensor}$) of the temperature sensor purge map 30-1 and a purge time change value ($T_{purge\_variable}$) of the variable purge time map 40-1. As a result, the catalyst purge ECU 20 outputs a fuel rate control value ($F_{injection}$) in response to the variable purge time based on the variable purge time map 40-1 so that the injector 13 injects fuel according to the variable time. In this case, the fuel rate control value ($F_{injection}$) is output as a pulse width modulation (PWM) duty.

FIG. 5 illustrates an example in which the catalyst system 10 is controlled by the catalyst purge control based on engine temperature using the variable purge fuel rate control, according to the temperature modeling purge map 30-2 and the variable purge fuel map 40-2.

As illustrated in the drawing, the catalyst purge ECU 20 outputs fuel injection signals indicative of a engine temperature modeling-based engine temperature value ($T_{model}$) of the temperature modeling purge map 30-2 and a purge fuel rate change value ($T_{purge\_variable}$) of the variable purge fuel map 40-2. As a result, the catalyst purge ECU 20 outputs a fuel rate control value ($F_{injection}$) in response to the variable purge fuel rate based on the variable purge fuel map 40-2 so that the injector 13 injects fuel according to the variable fuel rate. In this case, the fuel rate control value ($F_{injection}$) is output as a pulse width modulation (PWM) duty.

FIG. 6 illustrates that a small amount of accumulated purge fuel is consumed by the effect of the catalyst purge control based on engine temperature using the variable purge time-based fuel rate control value ($F_{injection}$) or the variable purge fuel rate change value ($T_{purge\_variable}$), compared to the effect of the catalyst purge control based on deterioration.

As a result, the catalyst purge control based on engine temperature when the catalyst purge control is performed after fuel-cut ON/OFF improves fuel efficiency by reducing the amount of used catalyst purge fuel, compared to when only the catalyst purge control based on deterioration is performed.

As described above, the method for catalyst purge control based on engine temperature applied to the vehicle 1 according to the form of the present disclosure performs the catalyst purge control based on engine temperature in which the injection amount of purge fuel by the injector 13 is controlled based on the estimated engine temperature for catalyst purge control when the catalyst purge electronic control unit (ECU) 20 checks that the fuel-cut ON is changed to the fuel-cut OFF, and the catalyst purge control based on deterioration using the deterioration degree of the catalyst 11 when the estimated engine temperature is not calculated, thereby improving fuel efficiency by reducing the amount of used catalyst purge fuel in the low-temperature operating condition using the engine combustion characteristics for generating a small amount of nitrogen oxide when the temperature of the engine 2 is low.

As is apparent from the above description, the vehicle of the present disclosure has the following action and effect by applying an engine temperature to catalyst purge control.

Firstly, the catalyst purge control area of the catalyst system extends to the engine combustion characteristics based on the engine temperature by breaking away from an existing catalyst method based on deterioration. Secondly, it is possible to improve fuel efficiency by suppressing unnecessary consumption of fuel when the engine temperature is low in the catalyst purge. Thirdly, it is possible to effectively maintain catalyst purge performance by sufficiently controlling the injection amount of rich fuel in the high-temperature operating condition of the engine. Fourthly, since fuel is injected richer than the theoretical air-fuel ratio after the fuel-cut ON/OFF by the engine overrun, it is possible to improve fuel efficiency by reducing the injection amount of fuel of the catalyst even though the oxygen in the catalyst is purged. Fifthly, it is possible to maintain a level of emission similar to existing purge control reflecting catalyst deterioration by considering the engine combustion characteristics when the purge control is performed.

While the present disclosure has been described with respect to the specific forms, it will be apparent to those skilled in the art that various changes and modifications may be made without departing from the spirit and scope of the present disclosure.

What is claimed is:

1. A method for catalyst purge control, comprising the steps of:
performing, by a catalyst purge electronic control unit (ECU), catalyst purge control based on engine temperature;
calculating an estimated engine temperature by the catalyst purge ECU when fuel-cut is completed; and
controlling, by the catalyst purge ECU, an amount of purge fuel injected by an injector based on the estimated engine temperature for the catalyst purge control,
wherein performing the catalyst purge control comprises:
receiving a temperature value detected by a temperature sensor when a fuel-cut ON signal is changed to a fuel-cut OFF signal;
calculating the estimated engine temperature when the detected temperature value is received;
controlling an injection amount of catalyst purge fuel based on an operating condition determined by the calculation of the estimated engine temperature; and
controlling an injection amount of rich fuel based on the operating condition, and outputting a fuel injection signal to control the amount of the purge fuel.

2. The method of claim 1, wherein the estimated engine temperature is calculated by a temperature modeling.

3. The method of claim 2, wherein the temperature sensor is a coolant temperature sensor or an engine oil sensor, and the temperature modeling is based on a temperature detection value of the coolant temperature sensor.

4. The method of claim 1, wherein receiving the temperature value comprises:

checking the fuel-cut ON signal;
obtaining the detected temperature value by detecting vehicle information at a time of fuel-cut ON; and
checking the fuel-cut OFF signal when the detected temperature value is obtained.

5. The method of claim 4, wherein the temperature value includes at least one of a coolant temperature value or an oil temperature value.

6. The method of claim 1, wherein calculating the estimated engine temperature comprises:
calculating the estimated engine temperature by a temperature modeling based on the detected temperature value.

7. The method of claim 6, wherein the temperature modeling is performed when the detected temperature value is a coolant temperature value.

8. The method of claim 1, wherein controlling the injection amount of catalyst purge fuel comprises:
determining the operating condition by setting the estimated engine temperature as a threshold;
dividing the operating condition into a low-temperature operating condition and a high-temperature operating condition based on the estimated engine temperature;
reducing the injection amount of rich fuel in the low-temperature operating condition and using the injection amount of rich fuel in the high-temperature operating condition; and
outputting a fuel injection signal to control the injection amount of rich fuel.

9. The method of claim 8, wherein the operating condition is the low-temperature operating condition when the estimated engine temperature is less than a threshold value, and the operating condition is the high-temperature operating condition when the estimated engine temperature is equal to or greater than the threshold value.

10. The method of claim 9, wherein the threshold value is a temperature at which a generation of nitrogen oxide is reduced in an engine.

11. The method of claim 8, wherein the injection amount of rich fuel means a state in which an injection amount of fuel is richer than a theoretical air-fuel ratio ($\lambda=1$) for catalyst purge.

12. The method of claim 8, wherein the outputting the fuel injection signal to control the amount of purge fuel is performed by variable purge time-based fuel rate control using a purge time change when a purge fuel rate lambda value is maintained.

13. The method of claim 8, wherein the outputting the fuel injection signal to control the amount of purge fuel is performed by variable purge fuel rate control using a purge fuel rate change when a purge time is maintained.

14. The method of claim 1, wherein when the estimated engine temperature is not calculated, the catalyst purge ECU changes to catalyst purge control based on deterioration using catalyst deterioration.

15. A vehicle comprising:
a catalyst purge electronic control unit (ECU) configured to:
receive a temperature value detected by a temperature sensor when a fuel-cut ON signal is changed to a fuel-cut OFF signal,
calculate an estimated engine temperature when the detected temperature value is received,
control an injector configured to inject an amount of purge fuel to a catalyst by catalyst purge control based on an operating condition determined by the estimated engine temperature, when the estimated engine temperature is calculated, control an injection amount of rich fuel based on the operating condition, and output a fuel injection signal to control the amount of the purge fuel, and control the amount of the purge fuel injected by the injector by the catalyst purge control based on deterioration of the catalyst, when the estimated engine temperature is not calculated.

16. The vehicle of claim 15, wherein the catalyst purge ECU comprises an engine-based purge map for calculating a value of the estimated engine temperature, and a purge fuel control map for calculating a control value of the amount of the purge fuel.

17. The vehicle of claim 16, wherein the engine- based purge map comprises a temperature sensor purge map for calculating the estimated engine temperature value via a temperature sensor, and a temperature modeling purge map for calculating the estimated engine temperature value via a temperature modeling.

18. The vehicle of claim 16, wherein the purge fuel control map comprises a variable purge time map for controlling the amount of the purge fuel by variable purge time-based fuel rate control using a purge time change when a purge fuel rate lambda value is maintained, and a variable purge fuel map for controlling the amount of the purge fuel by variable purge fuel rate control using a purge fuel rate change when a purge time is maintained.

* * * * *